UNITED STATES PATENT OFFICE.

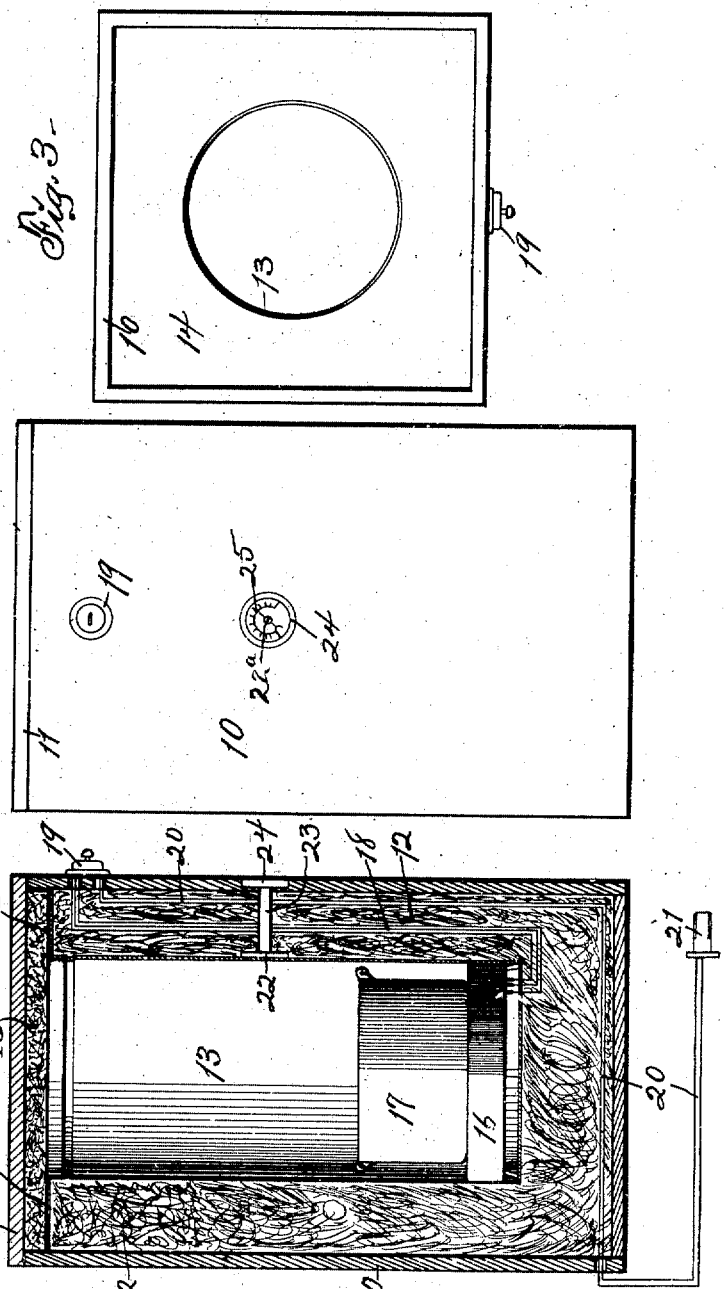

ROBERT S. KIRKPATRICK, OF DES MOINES, IOWA.

THERMO-ELECTRIC COOKER.

982,831.  Specification of Letters Patent.  Patented Jan. 31, 1911.

Application filed March 11, 1908. Serial No. 420,307.

*To all whom it may concern:*

Be it known that I, ROBERT S. KIRKPATRICK, a citizen of the United States of America, and resident of Des Moines, Polk county, Iowa, have invented a new and useful Thermo-Electric Cooker, of which the following is a specification.

The object of this invention is to provide improved means for cooking food.

A further object of this invention is to combine in a cooking apparatus means for utilizing electrically generated heat and insulated sealing devices for confining such heat.

A further object of this invention is to provide means for applying electrically generated heat to a cooking utensil, and confining the heat so generated to said utensil and its contents for the purpose of continuing the cooking operation after discontinuing the generating of heat.

My invention consists in the construction, arrangement and combination of elements hereinafter set forth, pointed out in my claims and illustrated by the accompanying drawing, in which—

Figure 1 is a vertical section of the complete device. Fig. 2 is a side elevation of the device. Fig. 3 is a plan of the device, the cover being removed.

In the construction of the device as shown the numeral 10 designates a containing vessel of any desired form and construction and provided with a closely fitting cover or lid 11. A lining 12, of insulating material, is placed in the receptacle 10 and covers the bottom and walls of said receptacle. A metallic lining 13 is mounted within and packed by the insulating material 12 and said insulating material surrounds the walls and crosses the bottom of said metallic lining. A flange 14 is formed on and projects outwardly from the upper margin of the metallic lining 13. A lining 15, of insulating material is fixed to the lower face of the lid or cover 11 and crosses the upper end of the metallic lining 13 and the flanges 14 thereof. An electric heater 16 of any desired construction is mounted in and rests on the bottom of the metallic lining 13 and is adapted to support a cooking utensil 17, of any desired form, within said metallic lining. Electric conductors 18 lead from the heater 16 through the bottom of the metallic lining 13 and thence upward through the insulated lining 12 and thence laterally through one wall of the container 10 to a switch 19 of any desired construction. Connecting conductors 20 lead from the switch 19 through the wall of the container and thence through the lining insulation 12 and out of the container to a plug 21 whereby connection may be made to the source of electric energy (not shown). A pyrometer 22 is arranged in contact with the outer face of the wall of the metallic lining 13 and has a tube 23 extending laterally through the lining insulation 12 to an indicator casing 24 in and opening to the outside of one wall of the container 10. The stem, spindle or shaft 22ª of the pyrometer extends through the tube 23 and carries an indicator 25 on its outer end in the casing 24 and said indicator is adapted for rotary travel over a dial in said casing.

In practical use of this device, food to be cooked is placed in the receptacle 17 which is then mounted in the metallic lining 13 and upon the heater 16. The cover 11 is then applied to the container 10; connection is made between the heater 15 and source of electric supply by means of the plug 21 and switch 19; and the temperature of the metallic lining and its contents is raised to the desired degree, as indicated by the pyrometer, by the action of the electric current on said heater. Then the current is turned off and the heat generated thereby is retained, confined and utilized within the metallic lining 13 by the insulation linings 12 and 15. Sufficient heat having been generated and produced within the device to establish and initiate the process of cooking in the receptacle 17, sufficient heat can be maintained, after the current is cut off, in the manner described to complete the process of cooking without further application of the electric current.

Other forms of devices may be employed and the construction of those shown be varied in detail in many ways without departing from the spirit of my invention and I do not wish to be understood as limiting myself to the form and construction shown.

I have illustrated and described a unit only of the apparatus and such units may be multiplied indefinitely and served by the same or separate currents collectively or individually and selectively as desired.

I claim as my invention—

1. A thermo-electric cooker, comprising a container, an insulated lining therefor, an electric heater within said lining, a pyrometer extending through one wall of said container and lining and wholly contained in said wall, and means for closing said container.

2. A thermo-electric cooker, comprising a container, a lining or pad of insulating material within said container, a metallic lining within said insulating lining, an electric heater within said metallic lining, a cover for said container and a pad or lining of insulating material fixed to said cover, adapted to enter said container and crossing said metallic lining, said cover adapted to extend across said container.

3. A thermo-electric cooker, comprising a container having a padded lining, a metallic receptacle within said padded lining, a cover having a padded lining and adapted to extend across said container and close the metallic lining, an electric heater within said metallic lining, means for supplying current to said heater, means for controlling said current, and a pyrometer wholly contained in one wall of said container and padded lining and communicating with said metallic lining and having an indicator on one side of said container.

4. In a thermo-electric cooker, the combination of a padded container, an electric heater therein, a tube mounted through one wall of said container, a pyrometer at the inner end of said tube, an indicator at the outer end of said tube and a stem in said tube connecting said pyrometer and indicator, said tube wholly contained in said wall.

5. In a thermo-electric cooker, the combination of a padded container, an electric heater therein and spaced from the bottom thereof, a cooking utensil within said container and on said electric heater, and a pyrometer mounted through one wall of said container, said pyrometer wholly contained in said wall.

6. A thermo-electric cooker, comprising a container having a padded lining, a metallic receptacle within said padded lining, a cover having a padded lining and adapted to extend across said container and close the metallic lining, an electric heater within and spaced from the bottom of said metallic lining, circuit wires connected to said electric heater and extending through a wall of said container, a switch in such circuit, and a pyrometer mounted through one wall of said container, padded lining and metallic receptacle and having an indicator at the outer face of said wall.

7. In a thermo-electric cooker, a container, a cover mounted on and closing the upper end of said container, a metallic lining within and spaced from the wall and bottom of said container, insulating material mounted between the container and metallic lining, the metallic lining formed with a flange at its upper end extending across the insulating material to the container, said flange spaced from the cover, and an insulating lining mounted on the lower face of the cover and extending across said flange.

Signed by me at Des Moines, Iowa, this seventh day of March, 1908.

ROBERT S. KIRKPATRICK.

Witnesses:
THOMAS G. ORWIG,
S. C. SWEET.